United States Patent [19]
Camden et al.

[11] Patent Number: 5,225,221
[45] Date of Patent: Jul. 6, 1993

[54] PREPARATION OF CALCIUM-SUPPLEMENTED BEVERAGES BY DISPERSING CALCIUM HYDROXIDE IN PASTEURIZED JUICE STREAM

[75] Inventors: James B. Camden, Evendale; Paul J. Russo, Cincinnati; Jerome J. Schmitz, Cincinnati; Ronald Steppeler, Cincinnati, all of Ohio

[73] Assignee: The Procter & Gamble Company, Cincinnati, Ohio

[21] Appl. No.: 846,729

[22] Filed: Mar. 4, 1992

Related U.S. Application Data

[63] Continuation of Ser. No. 617,457, Nov. 21, 1990, abandoned, which is a continuation of Ser. No. 138,760, Dec. 28, 1987, abandoned.

[51] Int. Cl.⁵ .................................................. A23L 2/02
[52] U.S. Cl. ...................................... 426/74; 426/599
[58] Field of Search .............. 426/599, 74, 561, 330.3, 426/417, 519

[56] References Cited

U.S. PATENT DOCUMENTS

| | | |
|---|---|---|
| 1,141,458 | 6/1915 | Gore . |
| 2,325,360 | 7/1943 | Ayers ................................. 426/599 |
| 2,548,594 | 4/1951 | Edmonds ........................... 426/599 |
| 2,567,038 | 9/1951 | Stevens . |
| 2,928,744 | 3/1960 | Pontiny . |
| 3,723,133 | 3/1973 | Berry . |
| 4,477,481 | 10/1984 | Eisenhardt et al. . |
| 4,551,342 | 11/1985 | Nakel ................................. 426/590 |
| 4,664,920 | 5/1987 | Saleeb ................................ 426/599 |
| 4,722,847 | 2/1988 | Heckert ............................. 426/599 |
| 4,737,375 | 4/1988 | Nakel ................................. 426/590 |
| 4,919,963 | 4/1990 | Heckert ............................. 426/599 |

Primary Examiner—Carolyn Paden
Attorney, Agent, or Firm—Eric W. Guttag; Ronald L. Hemingway; William J. Winter

[57] ABSTRACT

The preparation of calcium-supplemented fruit juice beverages is disclosed. These beverages are prepared by homogeneously dispersing a calcium hydroxide slurry in a pasteurized or sterilized fruit juice stream.

5 Claims, No Drawings

PREPARATION OF CALCIUM-SUPPLEMENTED BEVERAGES BY DISPERSING CALCIUM HYDROXIDE IN PASTEURIZED JUICE STREAM

This application is a continuation of U.S. Ser. No. 617,457, filed Nov. 21, 1990 which is now abandoned which is a continuation of U.S. Ser. No. 138,760, filed Dec. 28, 1987 which is now abandoned.

TECHNICAL FIELD

This application relates to fruit juice beverages which are nutritionally supplemented with significant levels of calcium. This application particularly relates to a method for preparing these calcium-supplemented beverages.

Dietary calcium inadequacy may be a contributing cause to osteoporosis, at least for some populations. For example, a positive correlation between calcium intake and bone mass has been found across many age groups. It has also been suggested that the level of calcium intake early in life directly influences the peak bone mass achieved at skeletal maturity.

During the period of late teenage to yound adulthood, it has been found that a significant reduction in dietary calcium intake typically occurs. This is especially true of the female population where reduced dietary calcium intake usually happens much earlier in life compared to their male counterparts. Accordingly, females, as a class, are especially susceptible to a prolonged calcium deficit over their life span. This calcium deficit may be one reason for the greater incidence of osteoporosis in postmenopausal women.

Calcium can be obtained from a variety of dietary sources. The primary sources of calcium are dairy products, in particular milk. Milk provides a very valuable source of dietary calcium. However, beginning in late teenage to young adulthood and continuing through later life, milk is typically not consumed in sufficient quantities by the general population to obtain needed levels of calcium. This may be caused by the unattractiveness of milk as a drink for "social occasions". Indeed, it has been found that teenage girls, and especially young adult women, generally find milk to be a socially unattractive drink, as well as too caloric and unappealing in taste. Additionally, a significant portion of the population becomes lactose intolerant as they reach maturity, resulting in gastrointestinal problems if they consume milk.

To achieve greater consumption of calcium, a more appealing alternative to milk is apparently needed. This alternative must be one which is consumed in sufficient quantities to provide nutritionally beneficial amounts of calcium. Beverages which are consumed often by the general public at breakfast are fruit juice products, especially orange juice. Like milk, orange juice has a wholesome, nutritional image. Also, orange juice is generally considered to have an appealing taste. Accordingly, orange juice nutritionally supplemented with calcium could be viewed as an additional vehicle for achieving greater dietary calcium intake throughout life.

Nutritional supplementation of orange juice, or other fruit juices, with significant levels of calcium is not straight forward. Milk contains, on average, about 0.12% calcium by weight. Inclusion of such a high level of calcium in orange juice requires consideration of a number of issues.

One potential issue is insuring that the calcium, once solubilized, does not precipitate out of the juice. Precipitation of calcium from juice concentrates can be a very significant problem because of the high level of calcium present. However, precipitation of calcium from single-strength juice products can also occur due to the acid systems and other components present in the juice. Orange juice naturally contains a mixture of citric acid and malic acid. The most thermodynamically stable calcium citrate species which form when a calcium source is directly added to orange juice are also the most insoluble. These insoluble calcium citrate species can precipitate out of the orange juice fairly rapidly.

Ready-to-serve, calcium-supplemented chilled juice products have presented special calcium precipitation problems. To prolong stability against microbial and mold growth, chilled juice products are pasteurized or sterilized prior to being packed. This typically involves passage of the juice stream through high temperature (typically from about 180° F. (82.2° C.) to about 212° F. (100° C.) or ultra-high temperature (typically from about 212° F. (100° C.) to about 260° F. (126.7° C.) pasteurization or sterilization equipment. Examples of such equipment are plate and frame heat exchangers (high temperature) and direct steam infusion sterilizers (ultra-high temperature).

It has been surprisingly found that, as calcium-containing fruit juice streams pass through high temperature pasteurization or sterilization equipment, calcium salts present in the juice stream precipitate out. This is particularly true of calcium-containing citrus juice streams involving calcium hydroxide or calcium carbonate as the source of calcium supplementation. When calcium-containing citrus juice streams pass through high temperature pasteurization or sterilization equipment, insoluble calcium citrate can precipitate out. This precipitated calcium citrate typically deposits on the internal equipment surface of the pasteurizer or sterilizer. Without periodic shutdown and cleaning of the equipment, this precipitated calcium citrate eventually flakes off into the finished chilled juice product stream. (In the case of plate and frame heat exchangers, the precipitated and deposited calcium citrate can additionally reduce heat transfer efficiency.)

This precipitation problem can be reduced, to a certain extent, by increasing the amount of acid, relative to the amount of calcium, in the juice stream. However, the resulting chilled juice product can have a very sour taste. Calcium salt precipitation can also be reduced by lowering the level of calcium included in the juice stream but with the obvious disadvantage of limiting process and product flexibility. Accordingly, calcium needs to be added to chilled juice products in a way which prevents precipitation problems resulting from high temperature pasteurization or sterilization, delivers the desired level of calcium, yet avoids greatly increasing the sourness of the finished chilled juice product.

BACKGROUND ART

U.S. Pat. No. 3,723,133 to Berry et al, issued Mar. 27, 1973, discloses a dehydrated, deacidified citrus juice product, as well as a method for preparing this product. The method disclosed by this patent involves initial separation of the serum portion of the juice by centrifugation. The serum portion is pasteurized and dry, finely divided calcium or other metal hydroxide is then added to neutralize it. Precipitated calcium citrate is then removed by centrifugation from this neutralized serum, followed by recombination with the juice material residue left after the first centrifugation. This recombined product is concentrated, mixed with a foaming agent and then dried to obtain the dehydrated, deacidified citrus juice product. Besides citrus juices, the Berry et al method can be applied to "any other sugar-containing juice which varies from time to time in acid content." See Col. 3, lines 42–44.

U.S. Pat. No. 2,567,038 to Stevens et al, issued Sep. 4, 1951, discloses a method for preparing dried fruit juice concentrates. In this method, the juice acidity is buffered or partially neutralized by raising its pH, followed by pasteurization. (One of the methods for neutralizing and buffering juice acidity is by addition of an alkaline material such as calcium hydroxide or sodium hydroxide.) This pasteurized juice is then concentrated under suitable vacuum conditions, followed by addition of granular sugar in quantities sufficient to produce a moist, granular mixture. This sugar-juice mixture is dried to provide the dried fruit juice concentrate.

U.S. Pat. No. 2,928,744 to Ponting, issue Mar. 15, 1960, discloses a method for preventing decolorization of apple juice. In this method, the apple fruit is comminuted in the presence of essentially pure malic acid. Excess malic acid can be removed by addition to the juice of sufficient calcium carbonate or calcium hydroxide to restore the pH to its natural level. The excess malic acid precipitates out as calcium malate which can then be removed by filtration. See also U.S. Pat. No. 1,141,458 to Gore, issued Jun. 1, 1915, which discloses a process where calcium hydroxide suspended in water (milk of lime) is added to cider (or other fruit juice) to neutralize the free acids present, passed through a filter press to remove suspended substances, concentrated to provide a syrup containing calcium malate crystals, and then passed through a filter press to separate the syrup from the crystals.

U.S. Pat. No. 4,477,481 to Eisenhardt, Jr. et al, issued Oct. 16, 1984, discloses a method for freeze drying citrus pulp. In this method, wet citrus pulp is processed so that the pH is increased to at least about 4.0, followed by freezing and freeze-drying to a moisture content less than 10% by weight. The pH of the pulp can be increased by the use of potassium or calcium hydroxide.

DISCLOSURE OF THE INVENTION

The present invention relates to calcium-supplemented, single-strength fruit juice beverages, and in particular to a method for preparing these beverages. This method comprises the steps of:
a) providing an at least pasteurized fruit juice stream having no more than about 0.12% by weight solubilized calcium and from 0 to about 4% by weight citric acid;
b) providing a calcium hydroxide slurry; and
c) homogeneously dispersing the slurry in the pasteurized juice stream in a volume ratio appropriate to provide a calcium-supplemented fruit juice beverage having: 1) from about 0.05 to about 0.26% by weight solubilized calcium;
2) at least about 45% fruit juice;
3) a solids content of from about 2° to about 16° Brix; and
4) a pH of about 5.0 or less.

The method of the present invention avoids the calcium salt, and in particular calcium citrate, precipitation problems previously caused by high temperature pasteurization or sterilization of calcium-containing fruit juice streams. This prevents or, more typically, reduces the need for costly, periodic shutdowns of pasteurization or sterilization equipment for cleaning purposes. It also provides single-strength juice products containing the desired level of calcium without having to increase the amount of acid relative to the amount of calcium. This allows for preparation of chilled juice products, especially chilled citrus juice products, with lower acid contents and improved sweetness-sourness balance.

A. Definitions

As used herein, the term "fruit juice beverage" refers to a fruit juice product which comprises at least about 45% fruit juice and which is in a single-strength, ready-to-serve, drinkable form. Fruit juice beverages of the present invention can be of the "full-strength" type which typically comprise at least about 95% fruit juice.

Fruit juice beverages within the scope of the present invention also include extended juice products which are referred to as "nectars." These extended juice products typically comprise from about 50 to about 90% fruit juice. Preferred extended juice products comprise from about 50 to about 70% fruit juice.

As used herein, the term "concentrated fruit juice" refers to fruit juice from which a portion of the water has been removed.

As used herein, the term "fruit juice stream" refers to a generally homogeneous mixture of fruit juice materials, including concentrated fruit juice, fruit juice aroma and flavor volatiles, peel oils, sensible pulp or pomace, plus other materials such as additional edible acids, sources of calcium, other minerals, vitamins, and the like.

As used herein, the term "fruit juice" refers to citrus juices, noncitrus juices such as apple juice, grape juice, pear juice, cherry juice, berry juice, pineapple juice, peach juice, apricot juice, plum juice, prune juice, passion fruit juice, banana juice, and mixtures of these juices.

As used herein, the term "citrus juice" refers to fruit juices selected from orange juice, lemon juice, lime juice, grapefruit juice, tangerine juice and mixtures thereof.

All amounts of fruit juice referred to herein are on a single-strength basis.

As used herein, the term "comprising" means various components can be conjointly employed in the fruit juice beverages and fruit juice streams of the present invention. Accordingly, the term "comprising" encompasses the more restrictive terms "consisting essentially of" and "consisting of."

As used herein, the terms "pasteurize" and "pasteurization" refer to treatment processes where materials are heated, without radiation, to temperatures and for periods of time sufficient to at least partially sterilize the material against microbial and mold growth, without substantial alteration of the chemical composition of the material. Pasteurized materials are characterized by prolonged stability against spoilage by microbial and mold growth. The terms "pasteurize" and "pasteurization" include the more restrictive terms "sterilize" and "sterilization" where the treated material is substantially free of microbial and mold growth.

B. Fruit Juice Stream

An important component in preparing the calcium-supplemented fruit juice beverages of the present invention is the fruit juice stream. Much of the following discussion on fruit juice stream formulation and subsequent pasteurization or sterilization will be directed at orange juice streams which are used to prepare highly preferred calcium-supplemented orange juice beverages according to the present invention. However, fruit juice streams based on other citrus juices such as grapefruit juice, noncitrus juices such as apple juice, as well as mixtures of juices, can also be formulated and pasteurized or sterilized according to this method.

The concentrated orange juice, orange juice aroma and flavor volatiles, sensible pulp and peel oils used in preparing orange juice streams of the present invention can be obtained by standard orange juice processing. See Nagy et al., *Citrus Science and Technology*, Vol. 2, (AVI Publishing Co. 1977), pp. 177-252 (herein incorporated by reference) for standard processing of oranges, grapefruit and tangerines. See also Nelson et al, *Fruit & Vegetable Juice Processing Technology* (3rd Ed., AVI Publishing 1980), pp. 180-505 (herein incorporated by reference) for standard processing of noncitrus juices such as apple juice, grape juice, pineapple juice, etc. to provide sources of juice and other juice materials for noncitrus juice streams. Juices from different oranges (e.g., Florida Valencia, Parson Brown, Hamlin, Pineapple, Brazilian Valencia, Per Rio) are frequently blended to adjust the sugar to acid ratio. A sugar to acid ratio of from about 8:1 to about 20:1 is considered acceptable. However, preferred sugar to acid ratios are typically from about 12:1 to about 18:1.

The peel of the orange can be initially rasped to provide peel oils which can be used in the orange juice stream of the present invention. Juice is typically extracted from the oranges by using automatic juicing machines, or less often by hand squeezing of the oranges. The type of equipment used to extract the juice is not critical. The raw juice exiting from the squeezing device contains sensible pulp, rag and seeds. The rag and seed are separated from the juice and sensible pulp in a primary finishing step. The sensible pulp is then typically separated from the remaining feed juice in a secondary finishing step. (This separated sensible pulp can be used as a source of sensible pulp in the orange juice streams of the present invention.)

In order to preserve the more desirable orange aroma and flavor compounds present, the feed juice can be stripped with steam to remove orange aroma and flavor volatiles. These volatiles are then recovered in the form of an orange aroma/flavor condensate which is separated to provide aqueous orange stripper essence and orange stripper oil. See European patent application 110,638 to Powers et al, published Jun. 13, 1984 (herein incorporated by reference) which discloses a suitable volatile stripping/recovery process, and the resulting stripper essence and stripper oil materials obtained. Other sources of aroma/flavor materials can also be used, in whole or in part. For example, commercial orange essences, commercial orange oils and cold pressed peel oils can be used to supply a portion, or all, of the aroma/flavor materials present in the orange juice stream. Non-orange sources of natural flavoring can also be used as sources of aroma/flavor materials.

The feed juice (stripped or unstripped) can be concentrated by a variety of techniques which typically include evaporative concentration or freeze concentration. In evaporative concentration, the feed juice is passed through an evaporator, or more typically, a series of evaporators. Examples of suitable evaporators include the falling film type or, more typically, temperature accelerated short time evaporators (TASTE). Most concentrated orange juices are obtained by evaporative concentration. However, freeze concentration can also be used to obtain concentrated orange juice useful in the orange juice stream of the present invention. Freeze concentration typically involves passing the serum portion of the feed juice through a scraped wall heat exchanger to form substantially pure ice crystals which are then separated from the concentrated juice. A preferred freeze concentration method is disclosed in U.S. Pat. No. 4,374,865 to Strobel, issued Feb. 22, 1983, which is incorporated by reference. Unlike evaporative concentration, concentrated orange juice obtained by freeze concentration typically contains the aroma and flavor volatiles as well.

In addition to orange juice materials, the orange juice stream will often contain added edible acids. Orange juice naturally contains a significant amount of citric acid. However, the amount of citric acid actually present in orange juice is usually insufficient to adequately neutralize the calcium hydroxide which is subsequently added, while at the same time maintaining the desired pH and sourness character in the resulting juice product. Accordingly, edible acid typically needs to be added to the juice stream.

For fruit juice streams generally, this added acid typically comprises from 0 to 100% by weight citric acid and from 0 to 100% by weight malic acid. For orange juice streams, this added acid typically comprises from about 5 to about 90% by weight citric acid and from about 10 to about 95% by weight malic acid, and preferably comprises from about 5 to about 60% by weight citric acid and from about 40 to about 95% by weight malic acid. (For noncitrus juice streams such as apple juice streams, this added acid typically comprises from about 5 to 100% by weight citric acid and from 0 to about 95% by weight malic acid, and preferably comprises from about 20 to 100% by weight citric acid and from 0 to about 80% by weight malic acid.) Besides citric and malic acid, other edible acids such as phosphoric acid, fumaric acid, adipic acid, lactic acid, tartaric acid, gluconic acid or mixtures thereof can be added to the fruit juice stream. These acids can be added in their undisassociated form or else as the respective sour salt, e.g. citrate, malate, phosphate, tartrate, gluconate and lactate.

The level of added edible acids, plus those naturally present in the fruit juice (hereafter total acids), depends on the fruit juice stream involved, the level of calcium hydroxide to be added to the fruit juice stream, as well as the sourness and taste properties desired in the resulting fruit juice beverage. Typically, the total acid level in the juice stream is sufficient to neutralize from about 50 to about 180% of the subsequently added calcium hydroxide. Preferably, the total acid level in the juice stream is sufficient to neutralize from about 70 to about 150% of the added calcium hydroxide.

Because of its propensity to precipitate out as calcium citrate, the level of total citric acid (added citric acid, plus that naturally present) in the fruit juice stream needs to be carefully controlled. For citrus juice streams, the total level of citric acid can range from about 0.4% to about 4% by weight, and is preferably from about 0.6 to about 2.5% by weight. For noncitrus fruit (e.g., apple) juice streams, the total level of citric acid typically ranges from 0 to about 2.5% by weight.

The fruit juice streams of the present invention contain the sugars normally present in fruit juice products. These sugars include sucrose, fructose, high fructose corn syrup, glucose, invert sugar, and mixtures thereof.

The amount of sugar naturally present in the fruit juice is usually sufficient for the fruit juice streams of the present invention. However, in the case of extended fruit juice beverages, sugar is typically added, usually in the form of sucrose or high fructose corn syrup.

In addition to sugar, fruit juice streams used to prepare extended fruit juice beverages can contain other sweeteners. Other suitable sweeteners include saccharin, cyclamates, acetosulfam, L-aspartyl-L-phenylalanine lower alkyl ester sweeteners (e.g. aspartame), L-aspartyl-D-alanine amides disclosed in U.S. Pat. No. 4,411,925 to Brennan et al, issued Oct. 23, 1983 (herein incorporated by reference), L-aspartyl-D-serine amides disclosed in U.S. Pat. No. 4,399,163 to Brennan et al, issued Aug. 16, 1983 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), L-aspartyl-D-phenylglycine ester and amide sweeteners disclosed in U.S. Pat. No. 4,692,512 to Janusz, issued Sep. 8, 1987 (herein incorporated by reference), L-aspartyl-D-heteroaromatic-substituted-glycine ester and amide sweeteners disclosed in U.S. Pat. No. 4,692,513 to Blum et al, issued Sep. 8, 1987 (herein incorporated by reference), and the like. A particularly preferred sweetener for use in such extended juice products is aspartame.

Prior to pasteurization, the solids content (primarily as sugar solids) of the fruit juice stream usually is in the range of from about 5 to about 25° Brix. Typically, the solids content of such juice streams depends upon the amount of fruit juice contained therein and the volume ratio at which the juice stream is combined with the calcium hydroxide slurry. For fruit juice streams used to prepare full-strength beverages containing at least about 95% fruit juice, the solids content is typically from about 9 to about 16° Brix. For fruit juice streams used to prepare extended juice beverages which comprise from about 50 to about 90% fruit juice, the solids content is typically from about 8° to about 14° Brix (no other sweetener besides sugar) or from about 5° to about 9° Brix (other sweetener containing).

The fruit juice streams of the present invention are typically substantially free of added protein. Examples of such proteins include soy protein, whey protein concentrate, and the like. These proteins can react with fruit juice aromas and flavors and, if hydrolyzed, can form short-chain peptides or amino acids which have undesirable bitter flavors. For fruit juice streams of the present invention, the amount of added protein is generally no more than about 0.1% by weight. Preferably, these juice streams contain no added protein.

If desired, calcium salts can be added prior to pasteurization or sterilization of the fruit juice stream to provide partial calcium supplementation. Particularly suitable sources of calcium salts for this purpose include calcium carbonate, calcium oxide and calcium hydroxide. To a more limited extent, other calcium salts such as calcium sulfate, calcium chloride and calcium gluconate can also be used to provide partial calcium supplementation. The amount of these calcium salts added to the fruit juice stream prior to pasteurization or sterilization should be such that there is no more than about 0.12% by weight solubilized calcium present. Preferably, the fruit juice stream contains no more than about 0.05% by weight solubilized calcium prior to pasteurization or sterilization. Most preferably, there is no partial calcium supplementation of the fruit juice stream prior to pasteurization or sterilization. This minimizes the precipitation of calcium salts, in particular calcium citrate, out of the fruit juice stream as it is pasteurized or sterilized.

Other optional ingredients typically present in fruit juice products can also be included in the fruit juice streams of the present invention. For example, preservatives, vitamins and other minerals can be included. Suitable vitamins include A, D, E, C (ascorbic acid), $B_1$ (thiamine), $B_6$ (riboflavin), $B_{12}$, niacin, folic acid, and biotin. Other minerals besides calcium which can be included are iron, zinc, potassium, magnesium, manganese and copper. If desired, natural and synthetic colorings can be included in these fruit juice streams.

After it is formulated, the fruit fuice stream is then subjected to a pasteurization or sterilization step. Most fruit juice beverages prepared from these juice streams are packaged as chilled juice products. Unless the juice stream is prepared aseptically, a pasteurization or sterilization step is required to prolong the stability of the chilled juice product against microbial and mold growth.

Pasteurization of chilled juice products can be achieved by passage of the juice stream through high temperature pasteurization equipment. High temperature processing typically refers to processing at temperatures of from about 180° F. to about 212° F. (from about 82.2° to about 100° C.). Pasteurization of fruit juice streams by high temperature processing can be carried out through the use of indirect heat exchangers. Indirect heat exchangers can be either of the shell and tube type, or, more typically, of the plate and frame type. In either case, pasteurization of fruit juice streams with indirect heat exchangers tends to result in chilled juice products having poorer quality. This is due to the fact that the juice stream is exposed to high surface temperatures for relatively long periods of time because of inefficient heat transfer.

Fruit juice streams of the present invention are preferably pasteurized or sterilized by the use of ultra-high temperature processing. Ultra-high temperature processing typically refers to processing at temperatures of from about 212° to about 260° F. (from about 100° to about 126.7° C.). The advantage of ultra-high temperature processing is that the rate of microbe kill and inactivation increases faster than the rate of chemical degradation of the juice stream. Accordingly, by the use of ultra-high temperature processing, it is possible to pasteurize or sterilize fruit juice streams without significantly and adversely affecting the quality of the resulting chilled juice product.

Ultra-high temperature processing is typically carried out by direct heat exchange methods. Direct heat exchange methods are capable of reducing the length of time the juice stream is exposed to very high temperatures to as little as a few seconds, e.g., from about 2 to about 6 seconds. Direct heat exchange methods include both steam injection and steam infusion. Direct steam infusion methods are particularly preferred for pasteurizing or sterilizing fruit juice streams of the present invention. Examples of suitable direct steam infusion pasteurization systems include the Crepaco Ultra-Therm infusion heater, as well as direct steam infusion systems supplied by Cherry-Burrell and DASI.

In direct steam infusion pasteurization or sterilization, the juice stream falls as thin films or sheets through a pressurized steam atmosphere. The steam condenses within the juice stream, causing it to be instantaneously heated by the release of the latent heat from the steam. Simultaneously, the stream is diluted with an amount of water directly related to the desired temperature rise. Fruit juice aroma and flavor materials volatilized during this direct steam infusion process are subsequently recondensed back into the fruit juice stream.

The fruit juice stream is preferably passed through a preheater prior to direct steam infusion pasteurization or sterilization. Typically, the fruit juice stream is preheated to a temperature of from about 40° to about 100° F. (from about 4.4° to about 37.8° C.). Preferably, the fruit juice stream is preheated to a temperature from about 60° to about 85° F. (from about 15.6° to about 29.4° C.). Preheating of the fruit juice stream minimizes the time and temperature necessary to achieve pasteurization or sterilization during direct steam infusion heating. Reducing the time and temperature of pasteurization or sterilization better preserves the quality of the resulting chilled juice products.

Once pasteurized or sterilized by direct steam infusion heating, the fruit juice stream, plus any resulting fruit juice aroma and flavor volatiles, are typically condensed and cooled by a bank of heat exchangers typically referred to as chillers. This cooling system is closed so that any vapors, including water vapors and aroma/flavor volatiles, are recondensed back within the fruit juice stream. The final temperature of the pasteurized or sterilized fruit juice stream after cooling is typically from about 30° to about 50° F. (from about $-1.1°$ to about 10° C.). Preferably, the pasteurized or sterilized fruit juice stream is cooled to a temperature of from about 30° to about 40° F. (from about $-1.1°$ to about 4.4° C.).

C. Calcium Hydroxide Slurry

Another important component in preparing calcium-supplemented fruit juice beverages of the present invention is the calcium hydroxide slurry. This slurry provides most, if not all, of the calcium supplementation for the fruit juice beverage. This slurry primarily comprises calcium hydroxide as the calcium source. However, if desired, minor amounts of other calcium salts such as calcium sulfate, calcium gluconate, calcium chloride, calcium phosphate and calcium lactate can also be included in this slurry.

This calcium hydroxide slurry is prepared by combining the appropriate amount of water and calcium hydroxide. (This mixture forms a slurry because calcium hydroxide is sparingly soluble in water.) The amount of calcium hydroxide in this slurry is used as the primary factor in controlling calcium supplementation of the resulting fruit juice beverage. Typically, calcium hydroxide comprises from about 2 to about 16% by weight of the slurry. Preferably, calcium hydroxide comprises from about 4 to about 12% by weight of the slurry.

Prior to being combined with the fruit juice stream, this calcium hydroxide slurry is preferably pasteurized or sterilized. Because the chemical composition of the slurry is affected minimally by heat treatment, various types of pasteurization or sterilization equipment can normally be used. Typically, indirect heat exchangers are used. These indirect heat exchangers can include shell and tube type and plate and frame type heat exchangers.

Even though various types of pasteurization or sterilization equipment can be used with the calcium hydroxide slurry, several factors need to be considered from the standpoint of processing ease and efficiency. When heated, the calcium hydroxide slurry can foul the interior surface of the equipment, especially in the case of indirect heat exchangers. Minimizing the temperature difference between the hot slurry and the heating media will help reduce fouling. Also, the equipment should be configured to encourage turbulent flow of slurry (such as smaller diameter tubes in the case of shell and tube heat exchangers) but without causing severe pressure buildup (e.g., diameter not so small that calcium scale buildup greatly restricts passage of the slurry through the tubes.)

Because the calcium hydroxide slurry is less affected by heat, the time taken to pasteurize or sterilize the slurry can be lengthened. Conversely, the temperature of pasteurization or sterilization can be lowered. Typically, the calcium hydroxide slurry is pasteurized or sterilized at a temperature of from about 150° to about 190° F. (from about 65.6° to about 87.8° C.) for from about 20 to about 60 seconds. Preferably, this calcium hydroxide slurry is pasteurized or sterilized at a temperature of from about 170° to about 180° F. (from about 76.7° to about 82.2° C.) for from about 20 to about 40 seconds.

After the calcium hydroxide slurry has been pasteurized or sterilized, it is then cooled as in the case of the pasteurized or sterilized fruit juice stream. Any suitable heat exchanger or chiller can be used to cool the pasteurized or sterilized calcium hydroxide slurry. The final temperature of the pasteurized or sterilized slurry after cooling is typically from about 30° to about 50° F. (from about $-1.1°$ to about 10° C.). Preferably, the pasteurized or sterilized slurry is cooled to a temperature of from about 30° to about 40° F. (from about $-1.1°$ to about 4.4° C.).

D. Dispersing the Calcium Hydroxide Slurry in the Pasteurized/Sterilized Juice Stream.

The calcium hydroxide slurry (with or without pasteurization/sterilization) is homogeneously dispersed in the pasteurized/sterilized fruit juice stream. As used herein, the term "homogeneously dispersed" refers to a method in which the calcium hydroxide slurry is completely and uniformly dispersed in the juice stream. Homogeneous dispersion minimizes localized areas of high pH/high hydroxide levels in the juice stream which can cause undesirable degradation of juice components, such as pectins. Any suitable batch or, preferably, continuous method for completely and uniformly mixing together diverse material streams can be used. Suitable devices for completely and uniformly mixing the calcium hydroxide slurry into the juice stream include homogenizers, surge tank systems with normal agitation and static mixers. Static mixers are particularly preferred for completely and uniformly dispersing the calcium hydroxide slurry in the juice stream. Suitable static mixers include commercially available Komax units.

Usually, the temperature of the calcium hydroxide slurry and the fruit juice stream are approximately the same when combined. Typically, the temperature of the slurry and the juice stream are from about 30° to about 50° F. (from about $-1.1°$ to about 10° C.). Preferably, the temperature of the slurry and juice stream are from about 30° to about 40° F. (from about $-1.1°$ to about 4.4° C.). After being combined, the temperature of the resulting calcium-supplemented fruit juice beverage is typically (but not always) higher than that of the entering slurry and juice stream. This is due to reaction of the calcium hydroxide in the slurry with the acids present in the juice stream.

The calcium hydroxide slurry is dispersed in the juice stream at a volume ratio appropriate to provide the desired calcium-supplemented fruit juice beverage. The volume ratio between the juice stream and the slurry typically acts as a fine control for determining the amount of calcium supplementation in the resulting fruit juice beverage. This volume ratio depends on a number of factors, including the Brix solids concentration of the juice stream, the amount of calcium hydroxide in the slurry, the calcium content desired in the resulting juice product and like factors. Typically, the volume ratio of the juice stream to calcium hydroxide slurry is from about 100:1 to about 20:1. Preferably, this volume ratio is from about 50:1 to about 30:1.

The juice stream and calcium hydroxide slurry also need to be combined so as to control the maximum pH of the resulting calcium-supplemented fruit juice beverage. When the calcium hydroxide slurry is dispersed in the juice stream, the pH of the resulting fruit juice beverage is typically higher than that of the entering juice stream. If the pH is increased to too high a level, microbial and mold growth can be encouraged, as well as the undesirable degradation of components, such as pectins, in the juice stream. Accordingly, the pH of the resulting calcium-supplemented fruit juice beverage should be no higher than about 5.0. Preferably, the pH of the resulting fruit juice beverage is no higher than about 4.5. The pH of the resulting fruit juice beverage can usually be controlled by appropriate selection of the volume ratio of juice stream to calcium hydroxide slurry, the level of calcium hydroxide in the slurry, the total acid level in the juice stream, or a combination thereof.

The fruit juice beverages obtained after combining the juice stream and slurry have from about 0.05 to about 0.26% by weight solubilized calcium, i.e. calcium ion which has been dissolved or suspended. Preferably, the fruit juice beverages obtained by the method of the present invention have from about 0.10 to about 0.20% by weight solubilized calcium.

The calcium-supplemented fruit juice beverages obtained have a solids content (primarily as sugar solids) which can range from about 2° to about 16° Brix. Typically, the solids content of such beverages depends on the amount of fruit juice contained therein. For full-strength beverages containing at least about 95% fruit juice, the solids content is typically from about 9° to about 14° Brix. For extended juice beverages which comprise from about 50 to about 90% fruit juice, the solids content is typically from about 5° to about 13° Brix (no other sweetener besides sugar) or from about 2° to about 8° Brix (other sweetener containing).

The level of total acids present in the calcium-supplemented fruit juice beverage depends on the particular source of fruit juice used, the amount of calcium added, as well as mouthfeel, taste and stability properties desired. For fruit juice beverages having from about 0.05 to about 0.26% by weight solubilized calcium, the level of total acids can range from about 0.4 to about 4% by weight. For preferred fruit juice beverages having about 0.10 to about 0.20% by weight solubilized calcium, the level of total acids preferably ranges from about 0.6 to about 2.5% by weight.

After the calcium-supplemented fruit juice beverages are obtained, they can be filled into cartons, bottles or other suitable containers. Since most of these packaged fruit juice beverages are chilled, they are preferably refrigerated.

SPECIFIC EMBODIMENTS OF THE PREPARATION OF CALCIUM-SUPPLEMENTED FRUIT JUICE BEVERAGES ACCORDING TO THE METHOD OF THE PRESENT INVENTION

The following are specific embodiments of the preparation of calcium-supplemented fruit juice beverages in accordance with the method of the present invention:

EMBODIMENT 1

An orange juice stream was formulated in a 2000 gallon (7570 liter) tank by combining the following ingredients:

| Ingredient | wt. % |
| --- | --- |
| Orange concentrate (65° Brix) | 22.80 |
| Orange pulp | 2.63 |
| Malic acid | 0.521 |
| Citric acid | 0.026 |
| Water-soluble flavors | 0.170 |
| Oil-soluble flavors | 0.005 |
| Water | Balance |

This juice stream had a solids content of 15.4° Brix, a titratable acidity (as % citric acid) of 1.19 and a pH of 3.5. This juice stream was sterilized by passage through a Crepaco Ultra-Therm Infusion Heater at a temperature of 215° F. (101.7° C.) and a rate of 35 gpm (132.5 lpm). The residence time was 2.5 seconds in the infusion heater. This sterilized juice stream was then chilled by passage through a plate and frame heat exchanger to 31° F. (−0.6° C.).

In a separate tank, a slurry of 10.3% by weight calcium hydroxide in water was prepared. The slurry was sterilized by passage through a plate and frame heat exchanger at a temperature of 180° F. (82.2° C.) and a flow rate of 0.75 gpm (2.8 lpm). The residence time was on the order of 40 to 60 seconds. The sterilized slurry was then chilled in a plate and frame heat exchanger to 40° F. (4.4° C.).

The sterilized juice stream and the sterilized calcium hydroxide slurry were combined by injecting the slurry into the juice stream at a ratio of 35 gallons (132.5 liters) of juice stream: 0.75 gallons (2.8 liters) of slurry, and then uniformly mixed in an inline Komax static mixer (6 elements, 2 inch (5.1 cm) diameter) such that the pH of the juice stream never exceeded 4.5. The exiting calcium-containing juice stream had a temperature of about 33° F. (0.6° C.). The resulting calcium-supplemented juice beverage had 0.12% by weight calcium, a pH of 4.05 to 4.10, a solids content of 13.1° Brix, and a titratable acidity (as % citric acid) of 0.76 to 0.77.

EMBODIMENT 2

An orange juice stream was formulated in a 2000 gallon (7570 liter) tank by combining the following ingredients:

| Ingredient | wt. % |
| --- | --- |
| Orange concentrate (65° Brix) | 22.80 |
| Orange pulp | 2.63 |
| Malic acid | 0.521 |
| Citric acid | 0.026 |
| Water-soluble flavors | 0.170 |
| Oil-soluble flavors | 0.005 |

| Ingredient | wt. % |
| --- | --- |
| Water | Balance |

This juice stream had a solids content of 15.5° Brix, a titratable acidity (as % citric acid) of 1.26 and a pH of 3.43. This juice stream was sterilized by passage through a Crepaco Ultra-Therm Infusion Heater at a temperature of 215° F. (101.7° C.) and a rate of 35 gpm (132.5 lpm). The residence time was 2.5 seconds in the infusion heater. This sterilized juice stream was then chilled by passage through a plate and frame heat exchanger to 31° F. (−0.6° C.).

In a separate tank, a slurry of 10.3% by weight calcium hydroxide in water was prepared. The slurry was sterilized by passage through a plate and frame heat exchanger at a temperature of 180° F. (82.2° C.) and a flow rate of 1.09 gpm (4.1 lpm). The residence time was on the order of 30 to 50 seconds. The sterilized slurry was then chilled in a plate and frame heat exchanger to 40° F. (4.4° C.).

The sterilized juice stream and the sterilized calcium hydroxide slurry were combined by injecting the slurry into the juice stream at a ratio of 35 gallons (132.5 liters) of juice stream:1.09 gallons (4.1 liters) of slurry, and then uniformly mixed in an inline Komax static mixer (6 elements, 2 inch (5.1 cm) diameter) such that the pH of the juice stream never exceeded 4.5. The exiting calcium-containing juice stream had a temperature of about 34° F. (1.1° C.). The resulting calcium-supplemented juice beverage had 0.18% by weight calcium, a pH of 4.17 to 4.20, a solids content of 13.2° Brix, and a titratable acidity (as % citric acid) of 0.76 to 0.77.

EMBODIMENT 3

An orange juice stream was formulated in a 2000 gallon (7570 liter) tank by combining the following ingredients:

| Ingredient | wt. % |
| --- | --- |
| Orange concentrate (65° Brix) | 21.35 |
| Orange pulp | 2.61 |
| Malic acid | 0.41 |
| Citric acid | 0.022 |
| Water-soluble flavors | 0.20 |
| Oil-soluble flavors | 0.006 |
| Water | Balance |

This juice stream had a solids content of 14.5° Brix, a titratable acidity (as % citric acid) of 1.15 and a pH of 3.43. This juice stream was sterilized by passage through a Crepaco Ultra-Therm Infusion Heater at a temperature of 215° F. (101.7° C.) and a rate of 35 gpm (132.5 lpm). The residence time was 2.5 seconds in the infusion heater. This sterilized juice stream was then chilled by passage through a plate and frame heat exchanger to 31° F. (−0.6° C.).

In a separate tank, a slurry of 10.0% by weight calcium hydroxide in water was prepared. The slurry was sterilized by passage through a plate and frame heat exchanger at a temperature of 180° F. (82.2° C.) and a flow rate of 0.79 gpm (3 lpm). The residence time was on the order of 40 to 60 seconds. The sterilized slurry was then chilled in a plate and frame heat exchanger to 33° F. (0.6° C.).

The sterilized juice stream and the sterilized calcium hydroxide slurry were combined by injecting the slurry into the juice stream at a ratio of 35 gallons (132.5 liters) of juice stream:0.79 gallons (3 liters) of slurry, and then uniformly mixed in an inline Komax static mixer (6 elements, 2 inch (5.1 cm) diameter) such that the pH of the juice stream never exceeded 4.5. The exiting calcium-containing juice stream had a temperature of about 34° F. (1.1° C.). The resulting calcium-supplemented juice beverage had 0.18% by weight calcium, a pH of 4.05 to 4.14, a solids content of 12.6 to 12.8° Brix, and a titratable acidity (as % citric acid) of 0.74 to 0.76.

EMBODIMENT 4

An orange juice stream was formulated in a 2000 gallon (7570 liter) tank by combining the following ingredients:

| Ingredient | wt. % |
| --- | --- |
| Orange concentrate (65° Brix) | 21.39 |
| Orange pulp | 2.64 |
| Malic acid | 0.525 |
| Citric acid | 0.026 |
| Water-soluble flavors | 0.206 |
| Oil-soluble flavors | 0.006 |
| Water | Balance |

This juice stream had a solids content of 14.8° Brix, a titratable acidity (as % citric acid) of 1.17 and a pH of 3.49. This juice stream was sterilized by passage through a Crepaco Ultra-Therm Infusion Heater at a temperature of 215° F. (101.7° C.) and a rate of 35 gpm (132.5 lpm). The residence time was 2.5 seconds in the infusion heater. This sterilized juice stream was then chilled by passage through a plate and frame heat exchanger to 31° F. (−0.6° C.).

In a separate tank, a slurry of 10.0% by weight calcium hydroxide in water was prepared. The slurry was sterilized by passage through a plate and frame heat exchanger at a temperature of 180° F. (82.2° C.) and a flow rate of 1.12 gpm (4.2 lpm). The residence time was on the order of 30 to 50 seconds. The sterilized slurry was then chilled in a plate and frame heat exchanger to 33° F. (0.6° C.).

The sterilized juice stream and the sterilized calcium hydroxide slurry were combined by injecting the slurry into the juice stream at a ratio of 35 gallons (132.5 liters) of juice stream:1.12 gallons (4.2 liters) of slurry, and then uniformly mixed in an inline Komax static mixer (6 elements, 2 inch (5.1 cm) diameter) such that the pH of the juice stream never exceeded 4.5. The exiting calcium-containing juice stream had a temperature of about 34° F. (1.1° C.). The resulting calcium-supplemented juice beverage had 0.18% by weight calcium, a pH of 4.29, a solids content of 12.7° Brix, and a titratable acidity (as % citric acid) of 0.58 to 0.59.

EMBODIMENT 5

A grapefruit juice-containing stream was formulated in a 2000 gallon (7570 liter) tank by combining the following ingredients:

| Ingredient | wt. % |
| --- | --- |
| Grapefruit concentrate (62° Brix) | 11.72 |
| Grapefruit pulp | 1.79 |
| Malic acid | 0.72 |
| Citric acid | 0.17 |
| Oil-soluble flavors | 0.017 |
| Liquid sucrose (67.5° Brix) | 7.16 |
| Ascorbic acid | 0.02 |

| Ingredient | wt. % |
|---|---|
| Water | Balance |

This juice stream had a solids content of 13.1° Brix, a titratable acidity (as % citric acid) of 1.44 and a pH of 2.92. This juice stream was sterilized by passage through a Crepaco Ultra-Therm Infusion Heater at a temperature of 215° F. (101.7° C.) and a rate of 35 gpm (132.5 lpm). The residence time was 2.5 seconds in the infusion heater. This sterilized juice stream was then chilled by passage through a plate and frame heat exchanger to 31° F. (−0.6° C.).

In a separate tank, a slurry of 10.0% by weight calcium hydroxide in water was prepared. The slurry was sterilized by passage through a plate and frame heat exchanger at a temperature of 180° F. (82.2° C.) and a flow rate of 1.12 gpm (4.2 lpm). The residence time was on the order of 30 to 50 seconds. The sterilized slurry was then chilled in a plate and frame heat exchanger to 33° F. (0.6° C.).

The sterilized juice stream and the sterilized calcium hydroxide slurry were combined by injecting the slurry into the juice stream at a ratio of 35 gallons (132.5 liters) of juice stream:1.12 gallons (4.2 liters) of slurry, and then uniformly mixed in an inline Komax static mixer (6 elements, 2 inch (5.1 cm) diameter) such that the pH of the juice stream never exceeded 4.5. The exiting calcium-containing juice stream had a temperature of about 34° F. (1.1° C.). The resulting calcium-supplemented juice beverage had 0.18% by weight calcium, a pH of 3.81, a solids content of 11.5° Brix, and a titratable acidity (as % citric acid) of 0.84.

EMBODIMENT 6

An apple juice stream is formulated in a 2000 gallon (7570 liter) tank by combining the following ingredients:

| Ingredient | wt. % |
|---|---|
| Apple concentrate (72° Brix) | 17.2 |
| Citric acid | 0.51 |
| Water-soluble flavors | 0.06 |
| Ascorbic acid | 0.06 |
| Water | Balance |

This juice stream has a solids content of 13° Brix, a calculated titratable acidity (as % citric acid) of about 0.8 and a calculated pH of less than about 4. This juice stream is sterilized by passage through a Crepaco Ultra-Therm Infusion Heater at a temperature of 215° F. (101.7° C.) and a rate of 50 gpm (189.3 lpm). The residence time is 2.5 seconds in the infusion heater. This sterilized juice stream is then chilled by passage through a plate and frame heat exchanger to 31° F. (−0.6° C.).

In a separate tank, a slurry of 10% by weight calcium hydroxide in water is prepared. The slurry is sterilized by passage through a plate and frame heat exchanger at a temperature of 180° F. (82.2° C.) and a flow rate of 1.6 gpm (6.1 lpm). The residence time is on the order of 20 to 30 seconds. The sterilized slurry is then chilled in a plate and frame heat exchanger to 40° F. (4.4° C.).

The sterilized juice stream and the sterilized calcium hydroxide slurry are combined by injecting the slurry into the juice stream at a ratio of 50 gallons (189.3 liters) of juice stream:1.6 gallons (6.1 liters) of slurry, and then completely and uniformly mixed in an inline Komax static mixer (6 elements, 2 inch (5.1 cm) diameter) such that the pH of the juice stream never exceeds 4.5. The exiting calcium-containing juice stream has a calculated temperature of about 34° F. (1.1° C.). The resulting calcium-supplemented juice beverage has 0.18% by weight calcium, a calculated pH of less than about 5, a solids content of 11.3° Brix, and a calculated titratable acidity (as % citric acid) of about 0.3.

What is claimed is:

1. A method for preparing sterilized single-strength calcium-supplemented ready-to-serve fruit juice beverages, which comprises the steps of
   A) completely and uniformly dispersing an aqueous sterilized slurry comprising from about 4 to about 12% by weight calcium hydroxide into a sterilized fruit juice stream having no more than about 0.05% by weight solubilized calcium and from about 0.4 to about 4% by weight citric acid in a volume ratio of juice stream to slurry of from about 50:1 to about 30:1 and at a temperature of from about 30° F. to about 50° F. (from about −1.1° C. to about 10° C.) to provide a sterilized single-strength calcium-supplemented ready-to-serve fruit juice beverage having:
      1) from about 0.10 to about 0.20% by weight solubilized calcium;
      2) at least about 45% fruit juice;
      3) a solids content of from about 2° to about 16° Brix; and
      4) a pH of about 4.5 or less; and thereafter
   B) avoiding any further pasteurization or sterilization of said calcium-supplemented fruit juice beverage which would cause precipitation of said solubilized calcium therefrom.

2. The method of claim 1 wherein the mixing step is carried out by continuously mixing the sterilized slurry into the sterilized juice stream in a static mixer.

3. The method of claim 2 wherein the sterilized juice stream and sterilized slurry are mixed together at a temperature of from about 30° to about 40° F. (from about −1.1° to about 4.4° C.).

4. The method of claim 2 wherein the sterilized juice steam is a sterilized orange juice stream having at least about 95% orange juice.

5. The method of claim 2 wherein the sterilized juice stream is a sterilized grapefruit juice stream having from about 50 to about 70% grapefruit juice.

* * * * *